United States Patent [19]

Sezaki et al.

[11] Patent Number: 4,891,834
[45] Date of Patent: Jan. 2, 1990

[54] RECORDING TELEPHONE SYSTEM EQUIPPED WITH A REMOTE CONTROL CHANGE-OVER SWITCH

[75] Inventors: Mutsuo Sezaki, Ikoma; Kinji Nishimura, Ise, both of Japan

[73] Assignees: C. Itoh Fuel Co., Ltd.; Nishitomo Co., Ltd., both of Japan

[21] Appl. No.: 259,127

[22] Filed: Oct. 18, 1988

[30] Foreign Application Priority Data

Oct. 28, 1987 [JP] Japan .................................. 62-270284

[51] Int. Cl.4 ........................ H04M 1/64; H04M 1/66
[52] U.S. Cl. ....................................... 379/67; 379/77; 379/82; 379/199
[58] Field of Search ...................... 379/77, 74, 373, 82, 379/67, 105, 102, 199

[56] References Cited

U.S. PATENT DOCUMENTS

| | | | |
|---|---|---|---|
| 3,783,193 | 1/1974 | Lee | 379/102 |
| 4,577,063 | 3/1986 | Hanscom et al. | 379/82 |
| 4,591,664 | 5/1986 | Freeman | 379/73 |

Primary Examiner—Thomas W. Brown
Attorney, Agent, or Firm—Silverman, Cass & Singer, Ltd.

[57] ABSTRACT

A message telephone with message recording and reproducing function equipped with remote control switch is disclosed. The message telephone has a calling signal identification circuit and after counting a predetermined number of calling signals, if the calling party once disconnects the call and orginates a second call within a predetermined time interval the device works as a message telephone after providing an identifying MF signal pass-word to work various message functions under control of the remote calling party.

9 Claims, 5 Drawing Sheets

FIG_1

FIG_2

RECORDING TELEPHONE SYSTEM EQUIPPED WITH A REMOTE CONTROL CHANGE-OVER SWITCH

Background of the Invention (1) Field of the Invention

The present invention relates to a recording telephone system equipped with a remote control change-over switch being able to switch the telephone set equipped with a message recording and reproducing function from a condition operating as a normal telephone to one having the message recording/reproducing function being controlled from a remote telephone set.

(2) Related Art Statement

It has been known as a kind of multi-function telephone or housekeeping telephone which is equipped with a function so called as the "message function".

Namely, even since the opening the market of manufacture and sales of the telephone equipment to free competition, the house use telephone equipment has been developed remarkably to accommodate various novel functions. Among the multi-function telephone equipment ever developed and sold by manufacturers, there is one having a housekeeping function plus "message function".

What is meant by the "message function" is a telephone communication function to allow free exchange of messages among particular persons, i.e. among the members of a family, between intimate friends, between beloved persons, etc. by using telephone installed at outside, for instance, from a public telephone and by means of a particular secret code. This function is especially useful for conveying unexpected messages between persons whose location is unknown, for instance, to convey change of meeting place, change of appointment time, change of promised matter etc. and the message is transferred to a particular person who is using the system while keeping secret to a third person.

However, there are still disadvantages in the known multi-function telephone set equipped with the message function or in the message service developed for the public communication system controlled by a push button telephone network in the manner of use and/or the function. The main disadvantages are as follows.

Namely, the known multi-function telephone sets can have the message function only as an extension of its housekeeping telephone function so that the message function is unavailable unless the telephone set is previously switched to the housekeeping telephone position. Whereas, if the telephone set is switched to the housekeeping telephone position, it can not work as an ordinary telephone set unless it is switched back. Accordingly, the use as the message function is limited for a case when the whole members of a family are out of home and there is no need to use the telephone set as an ordinary telephone, or an individual owner of a telephone set is out from the location. The use in both the above cases is limited to a case that the telephone set is switched to its housekeeping telephone position.

Moreover, as for the manner of use of the function, more especially when a message is desired to be transmitted to particularly limited persons without leaking the content to a third person, it is actually difficult to use the function, since the confirmation whether or not the called party's telephone is switched to the housekeeping position is unobtainable in the known system.

Also when the telephone set is switched to the housekeeping telephone position, it is possible that the transmitted message content may be heard by an undesired third person especially if it is in a loudspeaker position and then the privacy cannot be maintained.

The message service or a message-board service under development in the public telephone system has a merit to communicate a certain message by using already existing push-button telephone sets since the system is incorporated in the telephone network service. However, it has another disadvantages as the manner of use is complicated and as the input communication number, private secret-code and the content of the message may be erased after lapse of a certain time so that the service cannot be used unless the communication number and the private secret-code are already determined between two parties and it had been registered.

The secret-code may tend to be simplified so that the private and secret content may be leaked to a third party.

Besides the above two systems, there is a service of "voice message" handled as an enterprise. However, it is costly depending upon the system and the admittance fee, monthly maintenance fee may become high due to the operational system so that it is rather difficult to use the service by an individual person.

OBJECT AND SUMMARY OF THE INVENTION

The present invention has its object to develop a message telephone system equipped with a remote controllable switching function so as to allow an interchange of messages among particular members acquainted with each other and the system can be connected as an ordinary telephone set to an already existing telephone line and it can be operated in a simple manner as a housekeeping telephone set having a message function only between the members who have knowledge of controlling.

The device according to the invention comprises a calling signal identification circuit and a switching circuit provided at the connecting terminal of a telephone line, and it operates an identification operation by the calling signal identification circuit at the time of receiving a telephone call, the incoming call is once disconnected after receipt of $n_1$ number of the calling signal and then recalled within a predetermined time $t_1$ second and the number of the calling or ringing signal of the second call exceeds over a predetermined number $n_2$ and the switching circuit is changed to a pass-word identification circuit and operates as a housekeeping telephone having the message function after confirming the pass-word.

EFFECT OF THE INVENTION

By using the device of the invention, the following effect may be obtained.

(1) While maintaining the proper function of an ordinary telephone set, message can be recorded or used or changed at the terminal device without ringing the bell by the control from other telephone set.

(2) The utilization is limited among members familiar to the operation and the pass-word so that a high confidentiality can be obtained. (3) For the general persons other than the aforementioned particular members, the device operates just as same as the usual telephone set and if there is no attendant, the device functions as a housekeeping telephone by the ringing over a predetermined member.

(4) A consideration can be arranged not to give any annoyance for a receiving call incidentally falling in the aforementioned preset time interval.

BRIEF EXPLANATION OF THE DRAWINGS

FIGS. 2-5 are the flow-charts for explaining the operation of the device of the present invention, /wherein;

FIG. 2 is to explain switching between an ordinary telephone and the message function, FIG. 3 is concerned with ordinary telephone operation, FIG. 4 is to explain pass-word message function operation, and FIG. 5 is to explain the message recording and reproducing function according to the present invention.

DETAILED EXPLANATION FOR A PREFERRED EMBODIMENT

The invention will now be explained by referring to the accompanying drawings.

The operational principle will be explained by using block diagram shown in FIG. 1.

Figure 1:
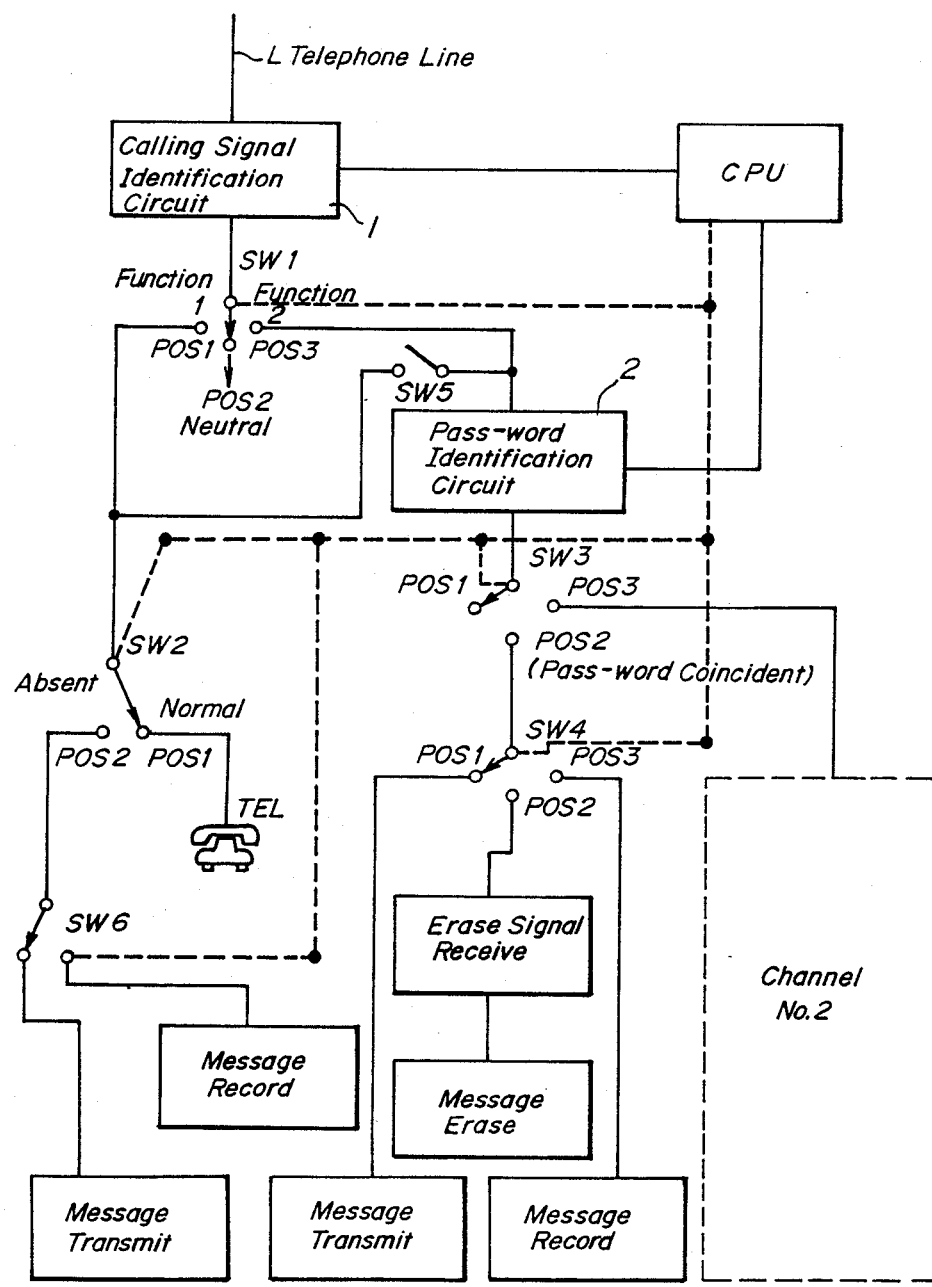
FIG. 1 is a block diagram for explaining the operation of the device of the present invention.
Figure 2:
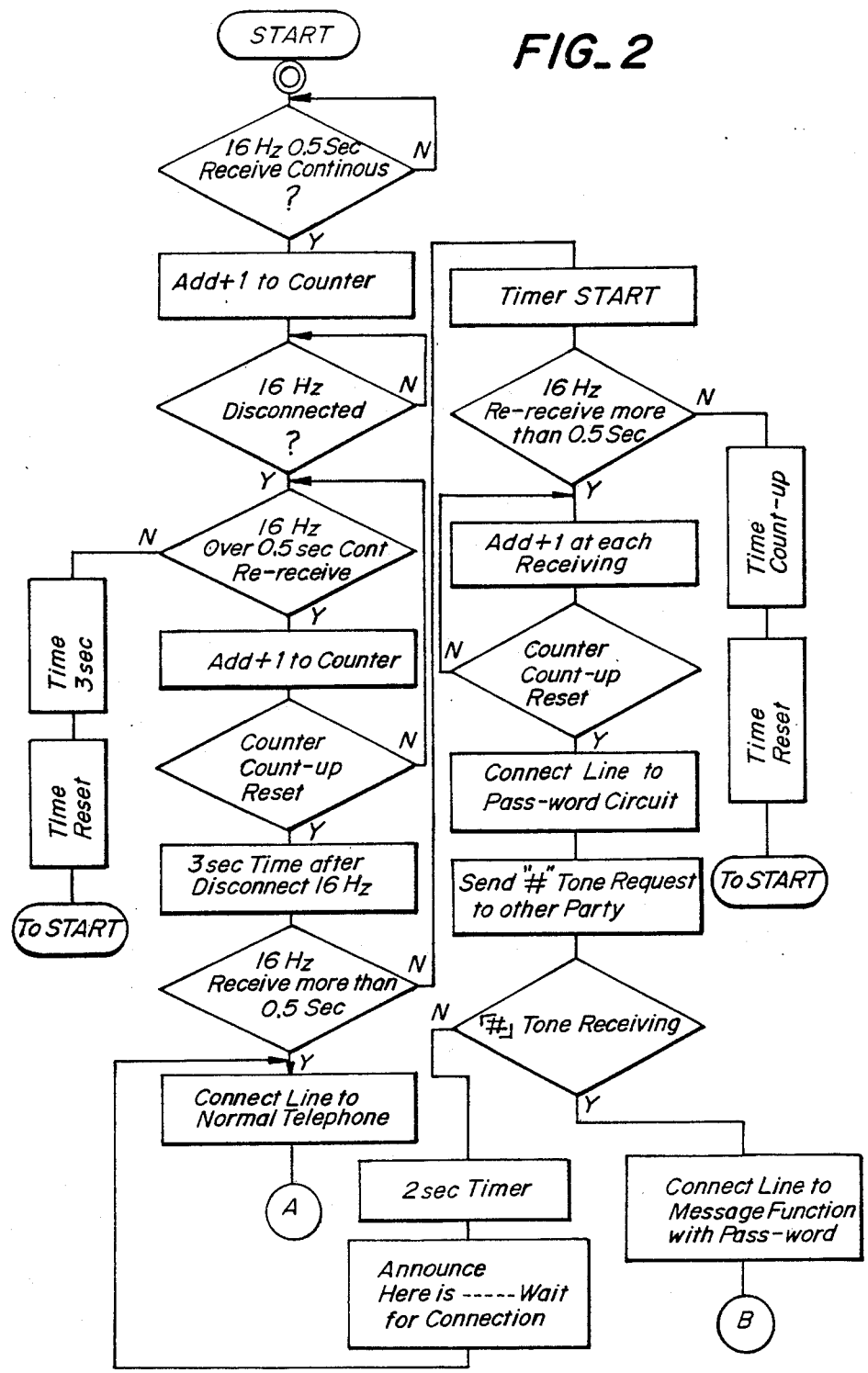
Figure 3:
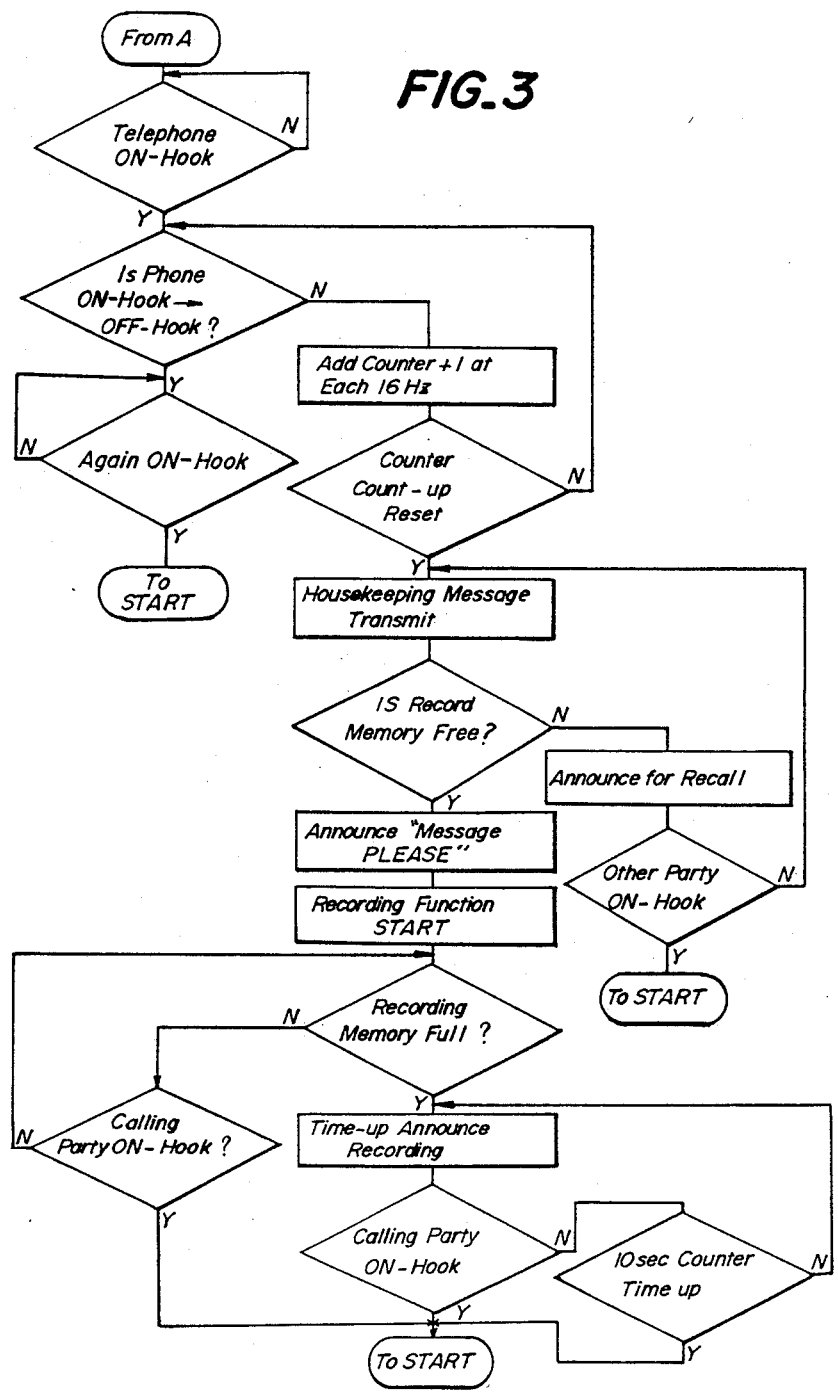
Figure 4:
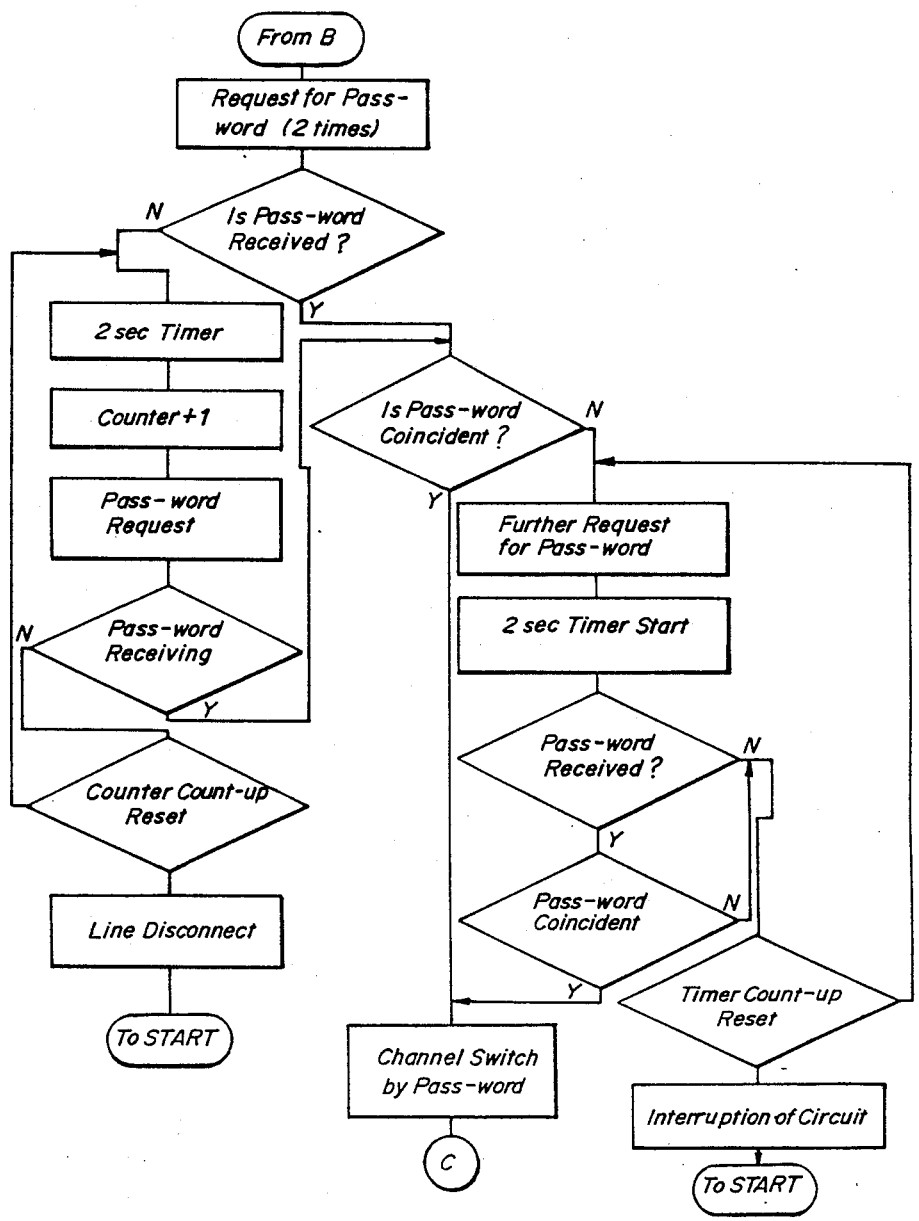
Figure 5:
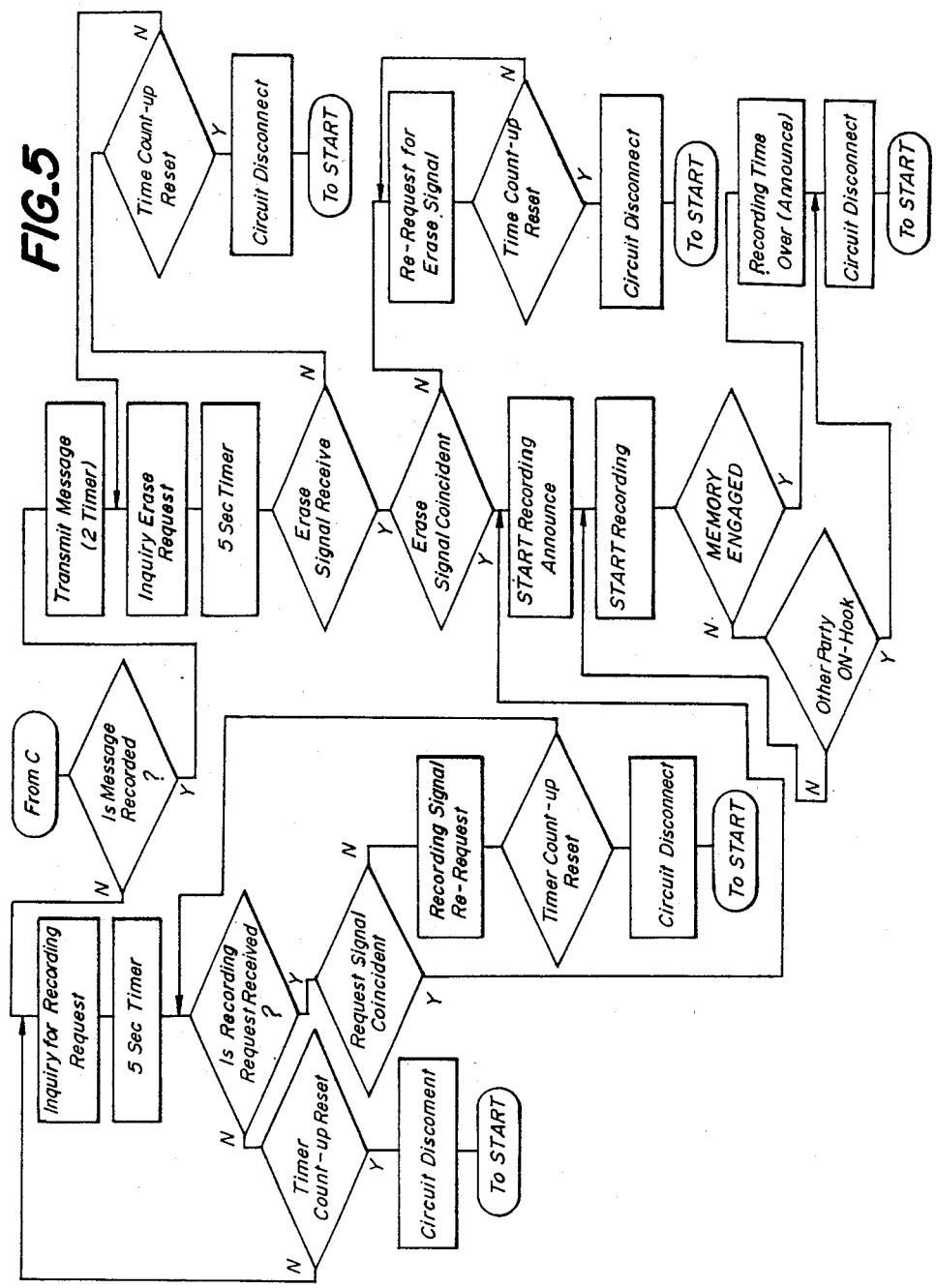

In FIG. 1, L designates end of a public telephone line and TEL designates a telephone set. In an ordinary subscriber telephone set, the above two parts are connected directly.

The device of the present invention is designed to be inserted between the telephone line L and the telephone set TEL; however, it is more convenient when the function is formed integral with the telephone set.

A calling signal identification circuit 1 is directly connected to the telephone line L. This circuit 1 identifies the telephone calling signal sent via the respective telephone line i.e. an electric signal having the basic wave of 16-25 Hz superposed with higher frequency audio signal and interrupted signal having one second ON-condition and two second OFF-condition, and the number $n_1$ of the signal receiving is applied to a micro-computer unit CPU.

The micro-computer unit CPU is a solid-state circuit including a number of electronic switches SW1-SW4 and SW6 etc. shown by using symbol like mechanical switches at various circuit locations. This unit receives an identification signal from the calling signal identification circuit 1 and a pass-word identification circuit 2 and controls respective switches in turn based on a judgement by using controlling information obtained by combining the abovementioned identification information with a timer housed therein and operates respective functions like "message transmission", "message recording", "erase signal receiving" and "message erase" shown by the blocks. The above functions may also be formed from solid-state circuits.

The various switches in FIG. 1 are shown at the signal watching position i.e. the position when the line is idle or in a free condition.

When the telephone line L has an incoming call, the calling signal identification circuit 1 responds to the incoming calling signal and counts the number $n_1$ thereof. During this term, the switch SW1 is located at its neutral position POS2 so that no signal is delivered to the telephone set TEL.

The function of this circuit 1 and that of CPU is as follows.

After receiving the $n_1$ number of the calling signal and when the incoming call is disconnected, the identification circuit 1 judges as the operation instruction of the message stand-by function 2 and the switch SW1 is switched from position POS2 to position POS3 to connect the pass-word identification circuit 2 and wait next incoming call in this condition.

At this condition if the next incoming call is received within a predetermined time $t_1$ second, at count $n_2$ of said receiving call, the circuit is changed to pass-word stand-by condition. By identifying a predetermined pass-word received thereafter the message function is now operated.

The message function may be explained for each sequential step from the receiving call condition as follows.

This message function may have the following functions according to the number of received calling signal.

(1) After counting $n_1$ number of the receiving call and then the call is disconnected and then another call is received and further counted $n_2$ number within $t_1$ second, the device of the present invention is connected to the telephone line and the circuit is now in stand-by condition of the message telephone function and awaiting a pass-word.

(2) If a predetermined MF signal is sent from the calling party, the aforementioned message function commences to operate.

(3) After entering this stand-by condition, if no MF signal is sent from the calling party, the circuit will transmit a previously prepared message and connect to the normal telephone function.

(4) When the calling signal is counted consecutively more than $n_3$ times, the circuit is connected to the normal telephone.

(5) After switching to the normal telephone, if further $n_1$ times of the calling signal is received, the normal housekeeping telephone function is connected without the pass-word. (It is also possible to switch to the housekeeping telephone by a manual switch provided in this device.)

(It should be noted that during the operation of the above (1)-(4), the bell of the telephone is not operated.)

After switching to the stage (1), it is possible to transmit the message, to erase the message and to rerecord the message by an MF signal to be sent from the calling side.

The number $n_1$ and $n_2$ of the calling signal and the waiting time $t_1$ may be fixed or may be varied each time according to the convenience of use.

The pass-word is sent from the calling party by MF signal (multi-frequency signal) and is identified by the device at the called party.

If required, it is possible to listen or monitor a prerecorded message by the telephone set connected to this device by using a pass-word and with confidential function. (not to connect the speaking circuit.)

The above operation is explained as follows. When the calling signal or the ringing signal is received, the calling signal identification circuit is operated and counts the number of the calling signal. If the number exceeds a predetermined member $n_1$ and if the calling party disconnects the connection by replacing the handset, the device judges as the message operation instruction and the switch SW1 is switched from POS2 to POS3 and awaits a further calling signal.

After the above switching to the position POS3 and a re-calling signal is received within $t_1$ second and if the calling party operates the MF signal to operate the message function, the device becomes in a stand-by condition of the voice message operation.

If a regular MF signal is transmitted from the calling party, an announcement is sent to the calling party for selecting channels. In the drawing, it is shown by way of example that the message function comprises two channels. The number of channels, however, can vary.

When the MF signal for instructing the voice message function operation is not delivered within a predetermined time or an erroneous operation instruction is given more than two times, the device transmits a previously decided message and then switches to a normal telephone set.

If the pass-word for the channel selection is given by the MF signal of a push-button telephone line, the pass-word identification circuit judges it whether it is identical with a predetermined DTMF pulse series.

When the pass-word is identical or coincident to the predetermined one, the switch SW3 is switched to a position POS2. In this condition, if a message is recorded, switched SW4 is switch to POS1 and an announcement is given for the message call and a received or recorded message is transmitted.

If no message is recorded already, switch SW4 is switched to POS3 and an announcement of inquiry is transmitted by the device for a message recording request and the device awaits a further transmission of an MF signal for recording. If a particular MF signal is received, a recording becomes possible.

After listening to the received message or recording a transmitted message, an announcement is sent to inquire whether it is desired to erase the old message and to record the new message, and to switch the switch SW4 to POS2 and wait an erase signal to be transmitted from the other party (calling party).

If there is non-coincidence of the pass-word for the channel selection, an announcement is given to the other party (calling party) in this effect and to request re-transmission of the pass-word. If the 2nd pass-word is still found as non-coincidence, it operates to return the switch SW1 to POS2 and enters a receiving call waiting condition.

In the above manner after a series of the sequence operation or during the operation of the sequence, the other calling party returns to the on-hook condition by replacing its handset, all the switches return to the initial condition and enters to a receiving call waiting condition.

If the original calling signal is sent over a predetermined number $n_1'$, it is judged as the normal telephone function is selected and the switch SW1 is switched to POS1 and kept thereon.

After the above condition, if the main telephone set (called party) does not enter to the off-hook condition and the call, continues to ring more than a predetermined number, the switch SW2 is switched to POS2 and a normal housekeeping telephone function is operated by the operation of SW5 without any pass-word.

When the switch SW2 is located at POS1, and the main telephone set at the receiving side enters on-hook condition, or a series of the operation is completed at the switch SW2 at POS1, and when the calling party enters on-hook condition by replacing the handset, the device brings all the switches SW to the initial condition and enters into a call waiting condition.

When it is desired to listen to the recorded message by the telephone set connected to this device, a manual switch SW5 is thrown to ON condition and by sending a pass-word the recorded message can be monitored.

Flow-charts for showing detailed operation of this device according to the present invention are shown in FIGS. 2-5.

In the above figures, a protection function or protection circuit such as an erroneous reading preventing operation caused by chattering of the switches or arrestor for high voltage, which are not related to the basic operation of the device are not shown.

The device can be made more simple by selectively removing non-required functions shown in the above flow-charts which are not required depending upon the convenience of a user.

CONCLUSION

As has been explained in the foregoing, although several kinds of multi-function telephone sets having the message function and housekeeping telephone function have been on the market since some time, the known multi-function telephone sets are kind of expansion of the housekeeping telephone function so that it does not work unless the telephone set is previously switched to the housekeeping telephone facility or being switched to the functional position after the calling signal or bell has been rung over a predetermined number of times. The present invention is quite convenient since the telephone set equipped with this device can be selectively switched by an automatic remote control irrespective of the fact that it is in normal operating condition or it is switched to the housekeeping telephone function, and by using only the number of received calling signal transmitted from the outside, the on-off signal of the telephone line and by using MF signal pass-word previously determined while not operating the bell of the telephone set at receiving end to switch it between the voice recording function and the normal telephone function.

What is claimed is:

1. A telephone message device having remote control switching capabilities comprising:

calling signal identification circuit means for identifying the number of calling signals transmitted to said device that are generated from another telephone;

MF signal password identification circuit means for identifying various passwords;

means for recording and reproducing a message from a calling party;

message function means for access by a calling party; and at least one micro-computer having a plurality of switching circuits under the control of said micro-computer, said switching circuits interconnecting said calling signal circuit means, said MF signal password circuit means, said means for recording and reproducing and said message function means in a predetermined way so that after a calling party disconnects a calling signal connection after counting a predetermined number $n_1$ of calling signals, said device is switching into a recording function stand-by mode, and upon receiving an additional calling signal within a predetermined time interval $t_1$, said means for recording and reproducing and said message function means are actuable by a calling party after said device identifies a password signal, provided by a calling party, by means of said MF signal password identification circuit means.

2. The telephone message device as defined in claim 1 including means for preventing the bell of a telephone in communication with said device from ringing during the counting of said predetermined number $n_1$ of calling signals.

3. The telephone message device as defined in claim 1, wherein said message function means include message transmission means and message recording means.

4. The telephone message device as defined in claim 1, wherein said predetermined number $n_1$ is 1 to 10.

5. The telephone message device as defined in claim 1, wherein said predetermined time interval $t_1$ is 1 to 60 seconds.

6. The telephone message device as defined in claim 1, wherein said message function means include erase signal receiving means and message erase means.

7. The telephone message device as defined in claim 1, wherein said message function means include a plurality of individual channels, each channel providing a separate message function.

8. The telephone message device as defined in claim 1, wherein said switching circuits are separate from said at least one micro-computer.

9. A method of enabling a calling party to receive and provide a separate private message from another telephone having a telephone message device equipped with remote control switching capabilities comprising the steps of:

providing calling signal identification circuit means for identifying the number of calling signals transmitted to said device that are generated from another telephone;

providing MF signal password identification circuit means for identifying various passwords;

providing means for recording and reproducing a message from a calling party;

providing message functions means for access by a calling party;

providing a plurality of switching circuits interconnecting said calling signal circuit means, said MF signal password circuit means, said means for recording and reproducing and said message function means in a desired way;

providing a micro-computer for controlling said switching circuits;

providing a predetermined number $n_1$ of calling signals to said device;

disconnecting the connection providing said calling signals after achieving said predetermined number $n_1$ of calling signals;

switching said device into a recording function standby mode;

providing a calling signal to said device within a predetermined time interval $t_1$;

entering a password;

identifying said password by said MF signal password identification circuit means; and enabling access to said message function means by a calling party.

* * * * *

UNITED STATES PATENT AND TRADEMARK OFFICE
CERTIFICATE OF CORRECTION

PATENT NO. : 4,891,834
DATED : January 2, 1990
INVENTOR(S) : Mutsuo Sezaki and Kinji Nishimura It is certified that error appears in the above-identified patent and that said Letters Patent is hereby corrected as shown below:

Column 6, line 60, "switching" should read --switched--.

Signed and Sealed this

Seventh Day of May, 1991

Attest:

HARRY F. MANBECK, JR.

Attesting Officer

Commissioner of Patents and Trademarks